United States Patent

Hayashi

[11] Patent Number: 4,877,070
[45] Date of Patent: Oct. 31, 1989

[54] METHOD OF REINFORCING A GUITAR NECK

[76] Inventor: Nobuaki Hayashi, 5882-2, Sasaga, Matsumoto City, Nagano Prefecture, Japan

[21] Appl. No.: 219,254

[22] Filed: Jul. 15, 1988

[30] Foreign Application Priority Data

Feb. 22, 1988 [JP] Japan .................................. 63-37574

[51] Int. Cl.$^4$ ........................... B27M 1/00; B27K 1/00
[52] U.S. Cl. ....................................... 144/364; 84/293; 144/359; 144/380; 144/353; 427/393
[58] Field of Search ............... 144/2 R, 345, 353, 380, 144/381, 364, 359; 84/293; 427/393 TR

[56] References Cited

U.S. PATENT DOCUMENTS

| 2,056,474 | 2/1935 | Low | 84/293 |
| 3,244,054 | 3/1963 | Berglund | 84/293 |
| 4,128,928 | 12/1978 | Shotts et al. | 29/156.8 |
| 4,237,944 | 12/1980 | Todd, III et al. | 144/350 |

FOREIGN PATENT DOCUMENTS

| 1421968 | 1/1988 | Japan . | |
| 418258 | 10/1934 | United Kingdom | 144/353 |

Primary Examiner—W. Donald Bray

[57] ABSTRACT

In a method of reinforcing a guitar neck in which the neck of the guitar is preliminarily bent into an arcuate shape, a long straight aperture is formed within the neck over substantially all of its length by a laser beam or a long drill and an adjusting rod is inserted into the long aperture to reinforce the neck after releasing the bend of the neck, the method comprises the steps of providing a spot facing for a nut for the adjusting rod at the top side of the long aperture as well as another spot facing for the head of the adjusting rod at the root side of the long aperture, the neck provided with the long aperture, the neck provided with the long aperture and the spot facings is submerged within the resin in a vacuum pan or an autoclave to promote resin impregnation into the interior of the neck portion, the neck then being polymerized with a heat energy polymerizing apparatus, an adjusting rod subsequently being inserted from a root side of the resin impregnated and polymerized neck into the long aperture a nut being fitted on the end of the adjusting rod at the top side of the neck portion to adjust to a desired correcting tension.

7 Claims, 2 Drawing Sheets

METHOD OF REINFORCING A GUITAR NECK

BACKGROUND OF THE INVENTION

The present invention relates to an improvement in a method of reinforcing a guitar neck.

Normally, the necks of guitars have a tendency to bend due to the tension of the stretched strings, so that an adjusting rod such as a long slender steel rod adjustable in length has been conventionally inserted into the necks to correct the bend and to maintain the necks in a normal straight condition. As an example of a method of reinforcing by inserting such an adjusting rod into the neck of the guitar, there is a generally wellknown method comprising the steps of providing a groove having a width substantially equal to the diameter of the adjusting rod in the form of a moderate inverted arch on the back side of the neck of the guitar, boring perforating apertures in a direction tangential to the extension of the groove to communicate respectively the opposite sides of the groove, inserting the adjusting rod through one of the perforating apertures and the groove, and filling a plug within the remaining voids at each end of the groove after tightening nuts on the ends of the adjusting rod for reinforcing the neck portion.

In addition to such a conventional reinforcing method, there is known a method of reinforcing the guitar neck to adjust the reinforcing and correcting stress by the nut on the end of the adjusting rod as shown in the Japanese Patent Publication No. 62-33590 comprising the steps of preliminarily bending the neck of the guitar into an arcuate shape, forming a long straight aperture within such bent neck through substantially the whole of its length, spot-facing both ends of such long aperture, inserting the adjusting rod from the top side of the neck into the aperture, and filling a plug into the a spot-face at the top end of the neck.

However, in the first mentioned reinforcing method, there are a number of troublesome problems such as the need to preliminarily treat the adjusting rod with a surface lubricant such as wax or oil, the excessive number of processes such as for making the groove, drilling and wood-plugging, the time and labor needed therefor, the unsightly traces of wood plug that remain, the processes for determining the thickness, width, length and arcuate shape etc. required for plugging the groove portion with wood, etc.

Furthermore, in the second reinforcing method, there are still some unresolved problems in that even through the expected reinforcing effect is established, the so-called wood elements, as natural polymer bodies are excessively warpable members, so that greater reinforcement of the neck is desirable as well as the restrictions on painting because of the pollution arising from using a spray gun in the paint process after the reinforcement of the guitar neck.

SUMMARY OF THE INVENTION

Therefore, in order to overcome such disadvantages in the conventional reinforcing methods, it is an object of this invention to provide an improved method of reinforcing a guitar neck in which the long aperture bored through substantially the whole length of a guitar neck preliminarily bent in an arcuate shape is used the neck being immersed in a resin filled vacuum pan or an autoclave to saturate it with resin, after which the neck is polymerized by a heat polymerizer to effect the reinforcing of the neck of the guitar itself and to steeply reduce the painting process to obtain effective string vibration without any loss in string vibration at the neck portion.

Thus, in accordance with the present invention, a method of reinforcing a guitar neck in which the neck of the guitar is preliminarily bent into an arcuate shape, a long straight aperture is formed within the neck over substantially all of its length by a laser beam or a long drill, and an adjusting rod is inserted into the long aperture to reinforce the neck after releasing the bend of the neck, comprising the steps of providing a spot facing for a nut for the adjusting rod at the top side of the long aperture as well as providing another spot facing for the head of the adjusting rod at the root side of the long aperture, accelerating saturation of resin into the interior of the neck portion by saturating the neck provided with the long aperture and the spot facings within the resin in a vacuum pan or autoclave polymerizing the neck in a heat energy polymerizing apparatus, and subsequently inserting the adjusting rod from the root side of the neck into the long aperture of the resin saturated and polymerized neck and fitting a nut on the end of the adjusting rod at the top side of the neck to adjust to the desired reinforcing and correcting stress.

According to the above mentioned method, which uses the long aperture bored by a laser beam or a long drill through the guitar neck preliminarily bent in an arcuate shape the strength of the neck itself can be greatly increased while the painting processes can be significantly reduced by saturating the resin into the guitar neck in a vacuum pan or autoclave to accelerate the saturation of the resin from the long aperture and the spot facings at the both ends of the aperture into the interior of the neck after spot facings are provided at both ends of the long aperture on the neck, to be followed by polymerizing with a heat polymerizing apparatus.

The other objects, features and advantages of the present invention will be more fully understood by reference to the following detailed description in conjunction with the accompanying drawings.

DETAILED DESCRIPTION OF THE INVENTION

Figure 1:
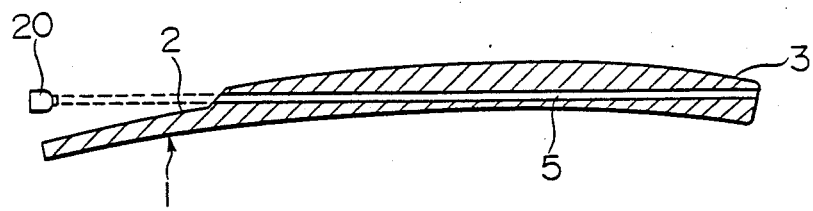
FIGS. 1 to 5 are views showing each of the steps of the method for reinforcing a guitar neck according to the present invention.
Figure 2:
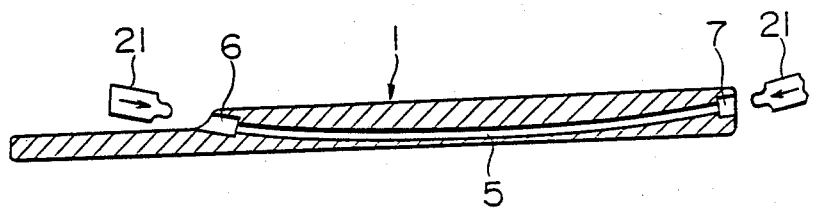

As shown in FIGS. 1 to 5, in the method of reinforcing a guitar neck in accordance with the present invention, the neck 1 of the guitar is first bent to an appropriately arcuate shape with the front side of the neck (string side) disposed on the outward side of the arc and a long straight aperture 5 is drilled by, for example a laser beam emitted from through substantially the whole length of the neck 1 from a stepped portion 2 near the head end of the neck 1 to the root portion 3 of the neck 1 maintained in the bent condition (FIG. 1). Next, after releasing the bend in the neck 1 allowing it to return to its normal condition, the long aperture 5 drilled on the neck 1 takes on a bowed or arcuate shape as shown in FIG. 2. Then, the long aperture 5 drilled on the neck portion 1 is worked by a spot facer 21 to make the spot faces at its opposite ends respectively to form a spot face 6 for a nut 11 for the adjusting rod 10 at the top end of the neck 1 and a spot face 7 for the head 12 of the adjusting rod 10 at the root end of the neck portion 1 respectively (FIG. 2).

Figure 3:
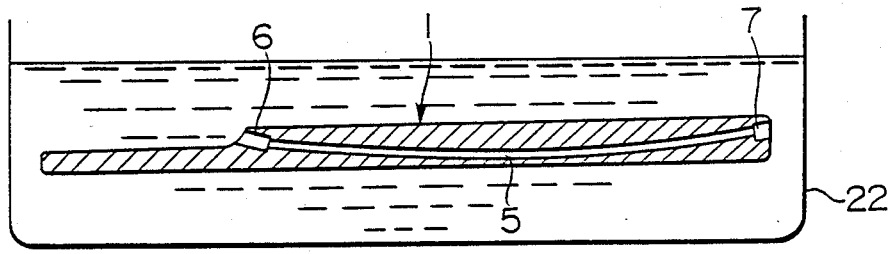

After the long aperture 5 and the spot facings 6 and 7 are formed in this manner on the guitar neck 1, the neck 1 is put in a vacuum pan or an autoclave 22 filled with resin to submerge the neck 2 within the resin as shown in FIG. 3 and immersed in the resin, to be impregnated by the resin for a given period of time at a predetermined pressure and temperature. As resin impregnation methods there are the reduced pressure method and the reduced pressure-increased pressure method, the amount of reduced pressure being 10-2 mm Hg and the increased pressure being 3-10 kg/cm$^2$. By such resin impregnation the effect of moisture content, one of the disadvantage of wood is greatly is improved. The resins which may be suitably utilized are vinyl monomers, vinylidene monomers and compounds having double bonds between carbon-carbon atoms such as diens for example styrene, methyl meta-acrylate, acrylonitrile, vinyl chloride and so on. By such resin impregnation, the resin is impregnated from the surface of the neck portion 1 and the bore surfaces of the long aperture 5 and of the spot facings 6, 7 into the interior of the neck 1 to reinforce the texture of the wood in the vicinity of the surface of the neck portion and the surfaces of the aperture or bore and to have greatly improved effects on moisture content of the wood for strengthening the neck portion itself.

Figure 4:
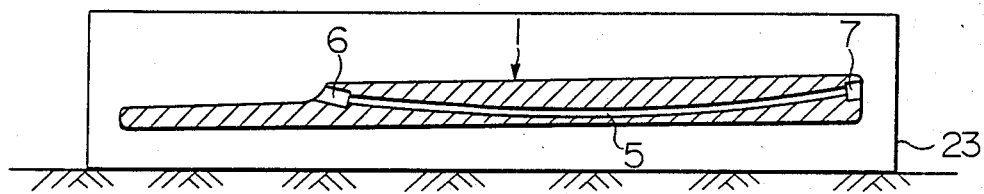

After the resin impregnation, the neck portion 1 is taken out of the vacuum pan or the autoclave 22 and is put into a heat energy polymerizing apparatus 23 for resin polymerization to sufficiently harden the resin impregnated within the neck portion 1 as shown in FIG. 4. The polymerizing reaction temperatures and heating times at this time differ with the configuration of the neck portion and impregnation rate and kind of resin. By such polymerization at a predetermined temperature and time, the wood which is a natural polymer body and the synthetic resin which is a synthetic polymer body are combined to supplement the deficiencies in the specific qualities of each element and to further promote the advantages thereof, and to thereby impregnate the monomer of the synthetic resin into the interior of the wood and induce a polymerizing reaction of the resin monomer by heating from the outside to convert it from a monomer to a polymer.

Figure 5:
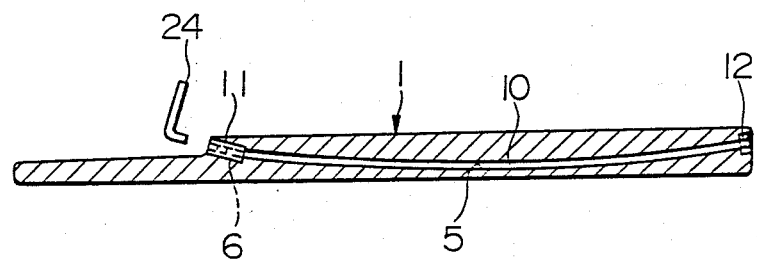

When the resin impregnation and the polymerization are completed and the impregnated resin is sufficiently hardened, a leading end of an adjusting rod 10 is inserted into the long aperture 5 from the root side of the neck portion 1, a nut 12 is mounted on the threaded leading end of the adjusting rod 10 at the spot facing 6 on the head side of the neck portion 1 and is tightened by a hex wrench 24 to adjust to a predetermined correcting tension to complete the desired reinforcing treatment as shown in FIG. 5.

In this manner, according to the method of reinforcing a guitar neck of the present invention, after drill-working the long aperture for inserting the adjusting rod while the neck portion is bent into the desired arcuate shape and machining spot-facings at both ends of the long aperture, such a neck portion is put into a vacuum pan or an autoclave for impregnating the resin thereinto, and then the neck portion is put into a heat polymerizing apparatus to polymerize the impregnated resin into the neck, so that the neck portion itself can be further strengthened over and above the reinforcement of the neck portion provided by the adjusting rod, by the impregnation of the resin from the surface and the bore surfaces of the neck and the hardening of the resin, and at the same time the following painting process can be reduced considerably to solve pollution problems caused by spray gun painting, and perfectly cutting off moisture absorption of the wood constituting the neck member. Furthermore, the impregnation of the resin from the interior of the aperture also increases the effects and an improvement in acoustic performance can be planned for from the prevention of vibration and resonance in the neck portion and string vibration loss in the neck portion and effects such as superior chemical resistance, durability, and resistance to corrosion and insect is improved. Moreover, in accordance with the method of the present invention, the non-uniformity and anisotropy of the wood material for the neck portion are improved, it becomes possible to use lower quality material to a greater extent, the painting quality is improved along with the neck for paint finishing becoming unnecessary, various kinds of colored wood can be obtained because coloring into the interior of the wood is possible so that emphasis of the grain and improvements in appearance can be expected, and further characteristic features associated with respective uses of the neck can be made by selecting the resin used and treatment conditions.

Furthermore, by practicing the method of the present invention, the stiffness and the hardwearing properties of the neck portion are increased about three times, the bending strength and the compression strength about two times, the shear strength about one and half times and the moisture content is increased about 50-70% in comparison to normally untreated wood to greatly improve stability in neck dimensions.

What I claim is:

1. A method for reinforcing a guitar neck comprising: preliminary bending the guitar neck into an arcuate shape; forming a long straight aperture for an adjusting rod within the neck over substantially all of its length by a laser beam or a long drill and at the same time forming a spot facing for a nut and another spot facing for a head of the adjusting rod at the sides of the long aperture; submerging the guitar neck within a resin in a vacuum pan or an autoclave to promote resin impregnation into the interior of the neck portion; polymerizing the guitar neck with a heat energy polymerizing apparatus; inserting the adjusting rod into the long aperture; and fitting the nut on the end of the rod to adjust to a desired correcting tension.

2. A method for reinforcing a guitar neck as claimed in claim 1, wherein the step of submerging the guitar neck into the resin is carried out under a reduced pressure of 10-2 mm Hg in the vacuum pan or an increased pressure of 3-10 Kg/cm$^2$ in the autoclave to promote the resin impregnation.

3. A method for reinforcing a guitar neck as claimed in claim 4, wherein the resin has double bonds between carbon-carbon atoms and is selected from the group consisting of vinyl monomers and vinylidence monomers.

4. The invention of claim 3, wherein the resin comprises styrene.

5. The invention of claim 3, wherein the resin comprises methyl meta-acrylate.

6. The invention of claim 3, wherein the resin comprises acrylonitrile.

7. The invention of claim 3, wherein the resin comprises vinyl chloride.

* * * * *

UNITED STATES PATENT AND TRADEMARK OFFICE
CERTIFICATE OF CORRECTION

PATENT NO. : 4,877,070

DATED : October 31, 1989

INVENTOR(S) : Nobuaki Hayashi

It is certified that error appears in the above-identified patent and that said Letters Patent is hereby corrected as shown below:

In Claim 3, line 56 "4" should be --1--.

Signed and Sealed this

Eighteenth Day of September, 1990

Attest:

HARRY F. MANBECK, JR.

*Attesting Officer*   *Commissioner of Patents and Trademarks*